United States Patent [19]
Covey, Jr.

[11] Patent Number: 5,291,870
[45] Date of Patent: Mar. 8, 1994

[54] FUEL VAPORIZING SYSTEM

[76] Inventor: Ray M. Covey, Jr., Remuda Ranch, Jack Burden Rd., Wickenburg, Ariz. 85358

[21] Appl. No.: 9,991

[22] Filed: Jan. 27, 1993

[51] Int. Cl.$^5$ .......................................... F02M 31/00
[52] U.S. Cl. ............................. 123/545; 123/552; 123/557; 261/DIG. 83; 261/145
[58] Field of Search ............... 123/543, 547, 557, 552, 123/545; 261/DIG. 83, 16, 145, 79.1

[56] References Cited

U.S. PATENT DOCUMENTS

| | | | |
|---|---|---|---|
| 2,349,676 | 5/1944 | Pratt | 261/16 |
| 2,742,886 | 4/1956 | McPherson | 261/DIG. 83 |
| 3,496,919 | 2/1970 | Gerrard | 261/145 |
| 4,092,966 | 6/1978 | Prosen | 261/79.1 |
| 4,167,165 | 9/1979 | Finlay et al. | 261/145 |
| 4,368,163 | 1/1983 | Covey, Jr. | |
| 4,476,840 | 10/1984 | Budnicki et al. | 123/557 |
| 4,494,516 | 1/1985 | Covey, Jr. | |
| 4,510,913 | 4/1985 | Decelle | 123/557 |
| 4,550,706 | 11/1985 | Hoffman | 261/DIG. 83 |
| 4,611,567 | 9/1986 | Covey, Jr. | |
| 4,836,173 | 6/1989 | Stires | 123/557 |
| 4,883,040 | 11/1989 | Rocky | 123/557 |
| 4,883,616 | 11/1989 | Covey, Jr. | |

*Primary Examiner*—Tony M. Argenbright
*Assistant Examiner*—M. Macy
*Attorney, Agent, or Firm*—Oblon, Spivak, McClelland, Maier & Neustadt

[57] ABSTRACT

A system for providing an air-fuel vapor mixture to an engine for improving completeness of combustion and also reducing emissions. The system includes a vaporizer within which a series of baffles are disposed such that air and fuel pass along a tortuous passageway defined within the vaporizer. Exhaust gases provide heat to the vaporizer, and as air and fuel pass along the passageway of the vaporizer, a homogenous air-fuel vapor mixture is produced, with the homogenous mixture exiting the vaporizer being supplied to the engine by way of an adapter plate assembly. When used with a carburetor, the adapter plate is disposed between the carburetor and the engine.

47 Claims, 7 Drawing Sheets

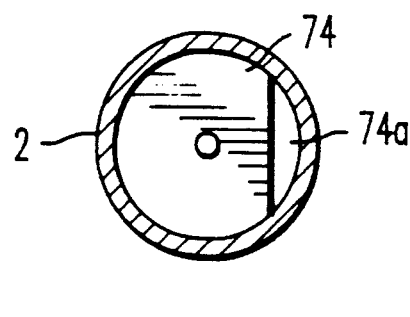
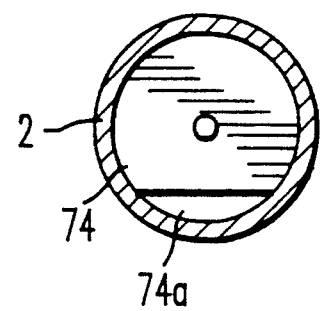
FIG. 4A    FIG. 4B
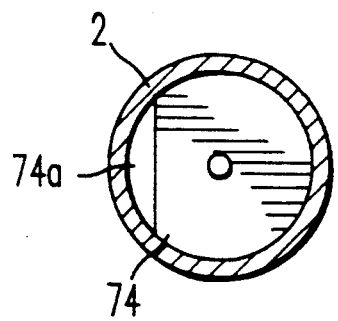
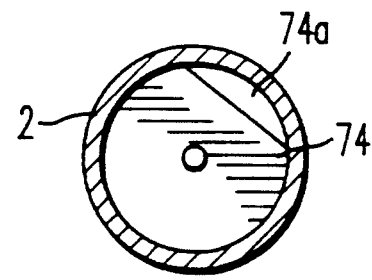
FIG. 4C    FIG. 4D

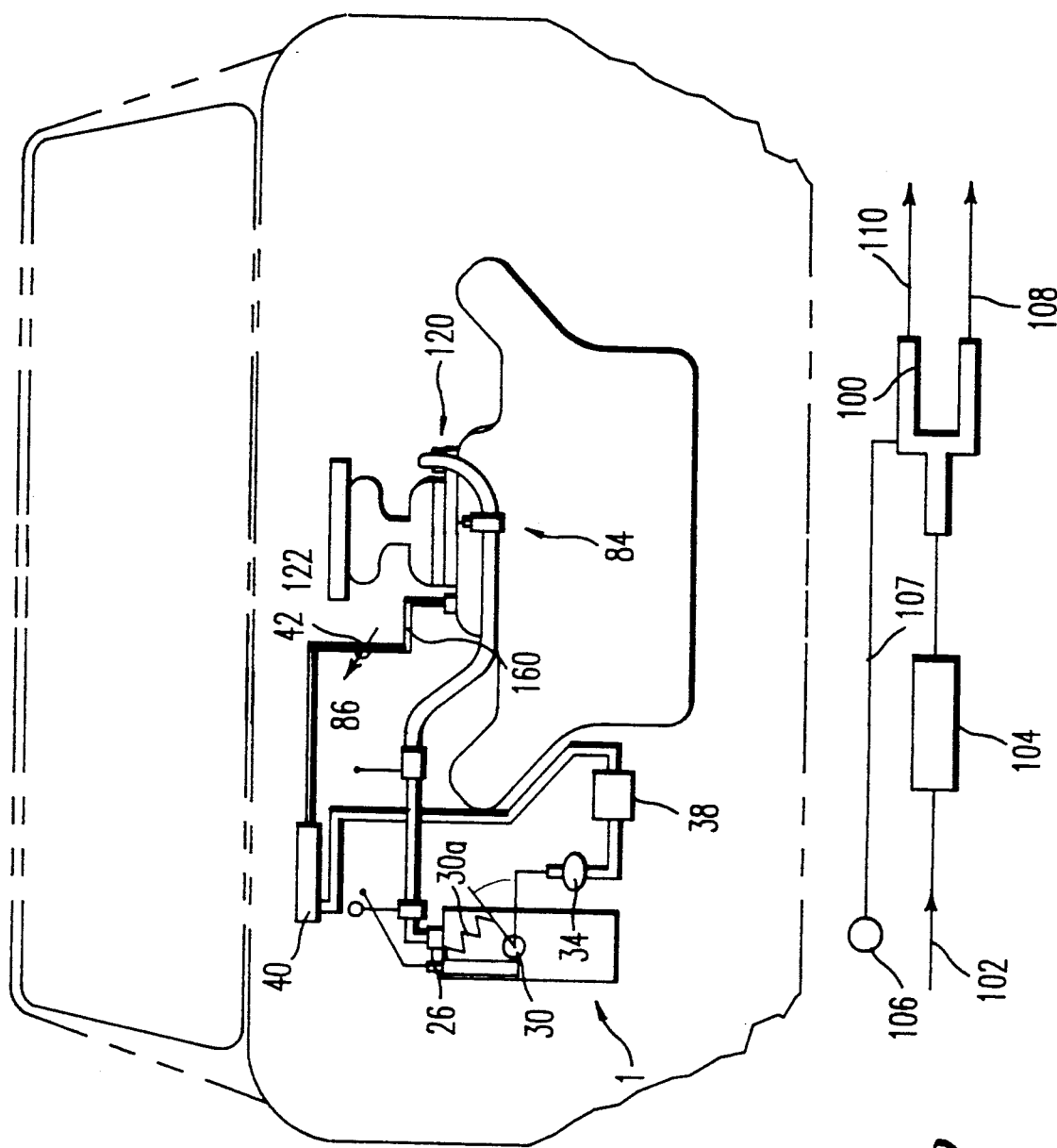

5,291,870

FUEL VAPORIZING SYSTEM

BACKGROUND OF THE INVENTION

1. Field of the Invention

The invention relates to fuel systems, and particularly to fuel systems which heat the fuel such that the fuel enters an engine as a vapor.

2. Discussion of the Background

It is constantly a goal to improve the performance of engines, particularly in automobiles and other motor vehicles. Due to the competitiveness of the industry as well as environmental constraints, motor vehicle engines must operate as efficiently as possible while minimizing emissions and providing satisfactory power performance. Toward these goals, one focus has been upon the ability to provide most efficient and complete combustion of the fuel consumed by the engine. In order to improve combustion of the fuel, one approach has been to heat the fuel to a vapor before the fuel enters the engine.

For example, in my earlier U.S. Pat. No. 4,883,616, a fuel system is disclosed in which the fuel passes from the fuel tank to an auxiliary carburetor, with the auxiliary carburetor providing an air and fuel mixture to a vaporizer unit. The vaporizer unit then heats the mixture such that the fuel is vaporized, and the vapor is then fed to the main carburetor of the engine. Although the system utilizes the concept of providing vaporized fuel to an engine, the system has been less than optimal from a power performance standpoint.

Other attempts to provide improved engine performance, emissions and economy utilizing vaporized fuel have also suffered from a number of shortcomings. Some attempts have suffered from the inability to adequately control the vapor and achieve full engine power in all driving conditions. In other attempts, the vapor produced condensed as it was traveling from the vaporizer toward the engine, somewhat defeating the purpose of the vaporizer.

Accordingly, an improved fuel delivery system is desired which provides a more optimal and effective fuel and air mixture to the engine. Such a system should be capable of providing an air and fuel mixture in a vaporized state such that fuel efficiency is increased while emissions are decreased. Preferably, the system should be adaptable to retrofit installation a well as for manufacture with the original equipment.

SUMMARY OF THE INVENTION

Accordingly, it is an object of the present invention to provide a fuel heating system which provides an air-fuel vapor mixture to an engine to increase the fuel efficiency and decrease emissions.

It is another object of the present invention to provide a vaporizer for a fuel system which can be installed on a retrofit basis, and which also can be incorporated in the original equipment when the engine is manufactured.

It is yet another object of the present invention to provide a vaporizer for a fuel delivery system in which the fuel and air pass along a convoluted or tortuous passageway such that the fuel is fully vaporized and mixed with air, thereby providing a homogenous air-fuel vapor mixture to the engine.

It is another object of the present invention to provide a fuel delivery system in which a homogenous air and fuel vapor mixture is formed which does not condense when traveling from the vaporizer toward the engine.

It is a further object of the present invention to provide a fuel supply system which includes a vaporizer, and which can be utilized in an engine having a carburetor as well as a fuel injected engine.

It is a still further object of the present invention to provide a vaporizing fuel supply system which can be utilized when conditions are appropriate, with the system switchable to the standard carburetor or fuel injection system at other times.

BRIEF DESCRIPTION OF THE DRAWINGS

A more complete appreciation of the invention and many of the attendant advantages thereof will be readily apparent from the following detailed description, particularly when considered in conjunction with the drawings i which:

FIGS. 4A-D depict various orientations of baffles arranged along the vaporizer of the present invention;

FIG. 9 schematically illustrates the overall fuel delivery system; and

FIG. 10 schematically illustrates a valve arrangement to allow for switching between vapor and standard carburetor or fuel injected operation.

DESCRIPTION OF THE PREFERRED EMBODIMENTS

Figure 1:
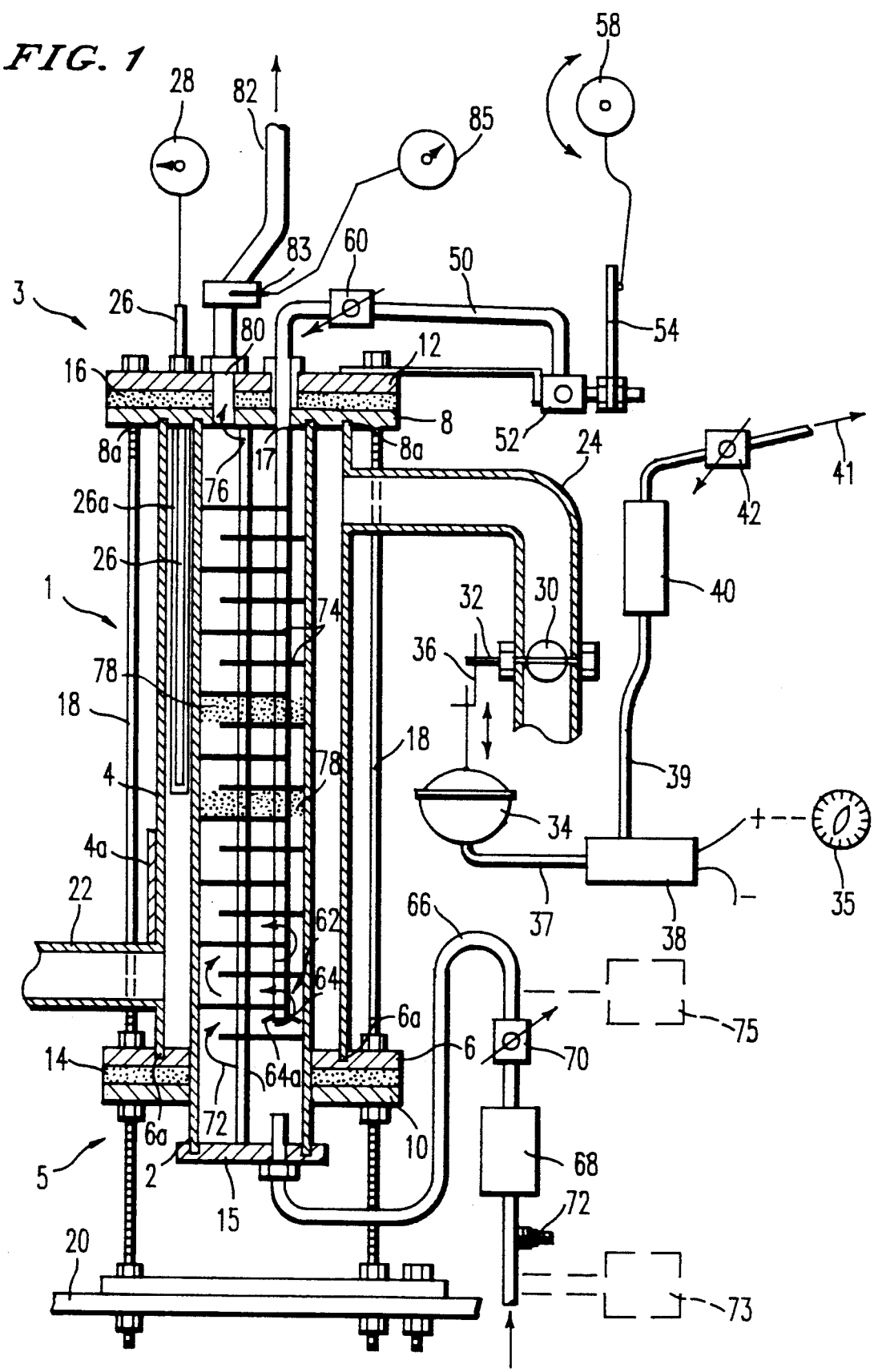
FIG. 1 illustrates a vaporizing device for use in the fuel delivery system of the present invention, in partial cross-section.

Referring now to the drawings, wherein like reference numerals designate identical or corresponding parts throughout the several views, FIG. 1 illustrates the vaporizer fuel system of the present invention in which the vaporizer includes an inner housing 2 formed preferably of red brass, with the housing sufficiently sealed such that the air and fuel being mixed and vaporized within the housing do not escape therefrom, and so that exhaust gases which circulate between a steel outer housing 4 and the inner housing 2 do not enter the inner housing 2. I have found red brass to be the best in handling high temperatures associated with the vaporizer fuel system. The outer housing 4 is welded or soldered (silver solder) to the exhaust in and out pipes, and can also be welded to the bottom plate 6. The housing 4 may also be tightly fitted into a groove 8a of the upper plate, thereby allowing for disassembly, while preventing leakage when assembled. The outer housing can also be seated in a precisely cut groove (6a) in the bottom plate 6. Additional end plates 10, 12 are also provided, with high temperature gaskets 14, 16 sandwiched between the plates. The vaporizer structure is also held together by bolts 18, which also allow for mounting the vaporizer upon a suitable support 20 on the vehicle. The inner housing is preferably welded or soldered (silver solder) to an end plate 15, with the other end received in groove 17 of plate 8 when the arrangement is assembled and tightened via bolts 18. Silver solder can be used for fixing the inner housing to the upper and lower plates.

The arrangement of FIG. 1 is advantageous in that it allows for easy assembly and disassembly of the various components, thereby allowing for inspection, repair or modification. Disassembly can also allow for cleaning, for example utilizing a conventional carburetor cleaner. However, it is to be understood that disassembly may not be essential in mass-produced versions, and therefore instead of a bolted arrangement, an overall welded construction may suffice, or a construction in which only the top is removable. In both the bolted and welded constructions, it may also be desirable to provide a drain (not shown) in the bottom to allow draining of any cleaning materials.

An inlet pipe 22 provides a source of heat for the vaporizer. In the preferred form of the invention, the exhaust pipe or conduit 22 is connected to the exhaust system of the vehicle. For example, the conduit 22 can be connected to the exhaust manifold, or to a location downstream of the exhaust manifold. The exhaust enters the conduit or pipe 22 and circulates within the outer housing and about the inner housing, and then exits through the exhaust outlet conduit or pipe 24. A temperature sensing probe 26 extends into the space between the inner and outer housing to thereby provide an indication of the temperature of the exhaust gases in order to determine when the temperature is sufficient for proper operation of the vaporizer. Preferably, the probe is contained within a red brass tube 26a to prolong the life of the probe. The probe 26 connected to a temperature gauge and/or control 28 which is displayed on the dash of the vehicle. The temperature gauge can be utilized by the operator to determine when the exhaust temperatures are sufficient such that the vaporizer is operational, and thereafter, the heat is controlled by an AC/DC vacuum solenoid, solenoid, vacuum storage and vacuum element together with a thermostat. An example of a suitable exhaust temperature control is disclosed in my earlier U.S. Pat. No. 4,883,616, which is incorporated herein by reference.

The choke plate 30 pivots by way of a bolt 32 which is rotated by a vacuum element 34. The vacuum element is connected to the bolt 32 by a suitable link such as piano wire 36. The vacuum element 34, in turn, is connected to a vacuum solenoid valve 38 by line 37. The vacuum solenoid valve 38 selectively places the line 37 in communication with a vacuum line 39 connected to a vacuum storage location 40. The vacuum solenoid valve 38 is operated by the thermostat, which preferably includes an electric temperature control dial 35 located on the dash to allow the thermostat temperature to be varied. The choke plate 30 is shown in the open position in FIG. 1, and when rotated 90°, the plate 30 is in the closed position. The vacuum storage 40 can be approximately two inches by four inches and is connected to the engine vacuum as indicated by arrow 41, with a one-way check valve 42 provided to prevent loss of the vacuum in the vacuum storage 40 (see also the connection 160 to the engine vacuum in FIG. 9). Although the size of the various elements can depend on a number of parameters, for example the size of the engine to which fuel is being supplied, the size of the outer housing can be, for example, on the order of 3-4 inches for automobiles. The inner red brass housing can be, for example, ½-2 inches in diameter and 12-16 inches in length. Preferably, the entire outer housing is insulated as represented schematically at 4a.

Fuel is supplied to the inner housing by way of a fuel inlet conduit 50. Fuel travels from a variable on/off valve 52 which includes an arm 54 for actuating the valve 52, with a suitable control 58 (FIG. 5) provided on the dash of the vehicle. The control 58 can be, for example, an adjustable push-pull knob, with the control connected to arm 54 by a cable, such as an aircraft bowden cable. For example, one type of knob, which is commercially available, provides adjustment when the knob is in the out position by rotating the knob, which in turn is associated with a screw. The knob can also be pushed in for an immediate cut-off, for example in an emergency. Of course, other types of knobs or switches could be implemented within the scope of the present invention. Generally, the valve 52 will not be adjusted often, and typically only one adjustment or long term periodic adjustments are necessary for a particular engine. However, adjustment may also be necessary where operating conditions or loads change dramatically. Particularly in more automatic designs, adjustment of the valve 52 from under the hood (rather than from the dash) may be sufficient. A one-way check valve 60 is disposed in the fuel inlet conduit 50, thereby preventing any backflow or back pressure from the interior of the inner housing.

Referring briefly to FIG. 10, a switching/valving arrangement is provided to allow for operation of an engine via the vaporizer, or by the standard carburetor or fuel injector. The FIG. 10 arrangement is upstream of the valve 52 and includes a two-way valve 100, preferably a two-way solenoid. Fuel is supplied via line 102 and filter 104, with an electric actuator switch 106 operating the valve 100 such that the fuel from line 102 passes either to the vaporizer as indicated by arrow 108, or to the standard carburetor/fuel injector as shown at 110. Once the exhaust temperature gauge indicates the exhaust temperatures are sufficiently high (e.g., 550° F. minimum), the operator can utilize the electric switch to change from standard operation to operation by fuel from the vaporizer. When operation by the vaporizer is desired, the operator flips the switch 106, which is electrically coupled (107) to the solenoid 100. The switch 106 actuates solenoid 100 such that flow is discontinued to the carburetor and fuel begins flowing to the vaporizer. Alternatively, the control switch 106 could include an automatic control arrangement or automatic switchover such that the fuel is delivered to the vaporizer (i.e.. to the interior of the inner housing 2) automatically when the exhaust temperatures are sufficient. However, even where the control of the fuel flow to the inner housing 2 is automatically controlled, a manual override should be provided such that the operator can discontinue fuel supply via the vaporizer when desired.

Typically, the exhaust temperature should be 550°-700° F. to operate the engine with the vaporizer, however, the temperature can vary dependent upon the type of fuel being vaporized.

As should be readily apparent from FIG. 1, the fuel supply conduit 50 enters a first end of the vaporizer and inner housing through the plates 8, 12 and the gasket 16, with the fuel inlet conduit extending from a first end, designated generally at 3, and toward a second end, designated generally at 5, of the vaporizer and inner housing. As a result, the fuel begins to be heated as it passes through the inner housing within the fuel inlet conduit. At the terminating end of the fuel inlet conduit 50, a nozzle portion 62 is provided. Preferably, the nozzle portion 62 includes a plurality of small outlet holes 64 disposed in the side walls of the conduit 50. The outlet holes are on the order of 10–20 thousandths of an inch and thereby disperse the fuel as it exits (as illustrated at 64a) the nozzle portion and is released into the interior of the inner housing 2. The size of the outlet holes 64 can also vary with engine size. The end of the conduit or fuel inlet 50 is preferably closed such that the fuel is released only via ports or holes 64. Although the fuel inlet 50 is illustrated as substantially a single continuous conduit, it is to be understood that the high temperature materials (e.g., brass) for conduit portions extending into the inner housing need not be utilized for the entirety of the conduit 50.

An air inlet conduit or line 66 is also provided for supplying air to the inner housing for mixing with the fuel. Air enters the conduit 66 from the ambient atmosphere, and passes through a filter 68 and one-way check valve 70. In addition, an adjustment device, such as an adjustable screw device 72 is provided in order to adjust the amount of airflow from the ambient to the inner housing of the vaporizer, e.g. for various engine sizes. In addition, a source of compressed air 73 may optionally be provided, which can be selectively placed in communication with the conduit 66. The operation of the vaporizer with compressed air may be desirable in certain high-power operations, such as in climbing a steep hill and/or carrying a heavy load. However, under most conditions, it will be sufficient to operate the vaporizer with the conduit 66 open to ambient air, since the movement of the air and fuel through the inner housing will cause the air to be drawn from the ambient through the air inlet conduit 66. In fact, in accordance with one aspect of the present invention, I have recognized that by simply providing the air inlet open to ambient, the mixture formed by the vaporizer is superior to introduction by known methods such as an auxiliary carburetor or compressed/forced air, under most operating conditions.

A small amount of water may also (optionally) be pumped into the air inlet conduit 66 as illustrated at 75. This can include an automatic electronic water injection system 75 available at parts stores. The water becomes steam in the vaporizer and even further reduces emissions of the engine to near zero. The steam can also help the interior of the inner housing stay clean. With the vaporized fuel delivery system of the present invention, emissions have been reduced to 3–8% of that of standard carburetor/fuel injection operation without the use of water. The emissions reduction is enhanced by the addition of water to near zero. For wintertime operation, the water can be a windshield washer type fluid which includes alcohol to prevent freezing.

The air enters the inner housing at the second end (5) of the inner housing such that it is mixed with fuel exiting the fuel inlet conduit 50. As the fuel exits through the nozzle portion 62, it is mixed with air and vaporization of the fuel begins within the heated inner housing 2.

In order to ensure complete vaporization of the fuel, and mixing with air, the air and fuel travel along a convoluted or tortuous passageway indicated by the arrows 72.

The arrangement of the interior of the inner housing is an extremely important aspect of the present invention. As discussed earlier, one problem with previous vaporization arrangements has been that the vapor at least partly condenses as it travels from the vaporizer to the engine. However, in accordance with the present invention, complete vaporization of the fuel occurs in the vaporizer, and further, the vapor is mixed with air such that a uniform homogenous air and fuel vapor mixture is provided. Testing has revealed that the vapor mixture provided by the vaporizer of the present invention has been able to maintain its vapor condition for as long as 20–25 minutes after exiting the vaporizer before condensing again. Accordingly, problems associated with condensation of the vapor as it travels from the vaporizer to the engine are avoided, since the vaporizer provides a superior homogeneous air-fuel vapor mixture.

The passageway for the air and fuel is defined by a number of baffles 74 (preferably red brass) disposed along the interior of the inner housing 2. For convenience, it is preferable that the baffles 74 be mounted (e.g., with silver solder) upon a center rod 76 which extends through the housing. With such a construction, the baffles can be conveniently removed for repair, cleaning or inspection merely by removing the top plate of the vaporizer and removing the rod 76 having the baffles mounted thereon. A number of pads 78 may also be disposed along the passageway defined between the baffles, with the pads 78 formed of a brass wool or mesh. The brass wool pads 78 increase the effectiveness or completeness of the vaporization of the fuel, since the fuel must come in contact or pass very closely adjacent to the strands of the brass pads, which become hot when the vaporizer is in use. The brass wool pads also make the passageway even more tortuous, thereby improving vaporization and homogeneity of the mixture.

Once the fuel and air has passed along the passageway defined within the inner housing 2, the fuel has become completely vaporized and the homogenous air-fuel vapor mixture exits the vaporizer through a vapor outlet 80, and into a vapor conduit 82. A vapor temperature probe 83 can also be provided, with a vapor temperature gauge 85 mounted on the dash. The vapor conduit 82 should be insulated (not shown) along its length to assist maintaining the vapor state.

Figure 2:
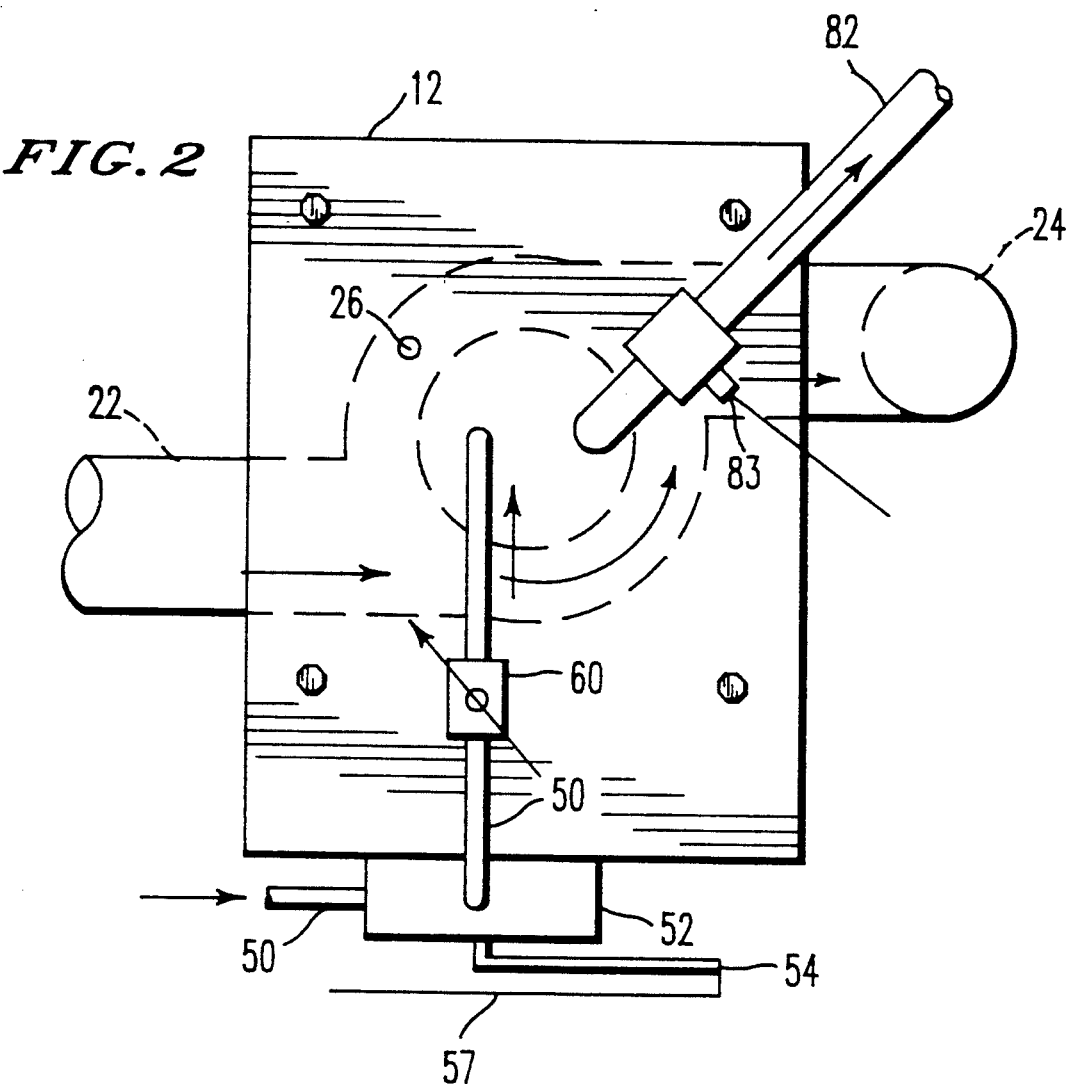
FIG. 2 is a top view of the vaporizing device of the present invention showing the various connections of the top plate.

FIG. 2 shows a top view of the vaporizer unit. Although the unit is illustrated in a vertical orientation (FIG. 1), it is to be understood that the vaporizer may also be disposed underneath a hood of a vehicle such that the vaporizer extends horizontally. A horizontal arrangement may be advantageous in providing a more compact design, however, a vertical arrangement can provide for easier access to the interior of the vaporizer by removing the plate 12 from the bolts (allowing for inspection, repairs or modification through testing). As shown in FIG. 2, the exhaust enters conduit 22, circulates between the inner and outer housings, and exits through conduit 24. The fuel travels through the fuel inlet conduit 50 through valve 52, and continues to travel through the conduit 50 via one-way check valve 60 and into the interior of the inner housing 2, with the homogenous air-fuel (and water or steam) vapor exiting through vapor outlet conduit 82.

Figure 3:
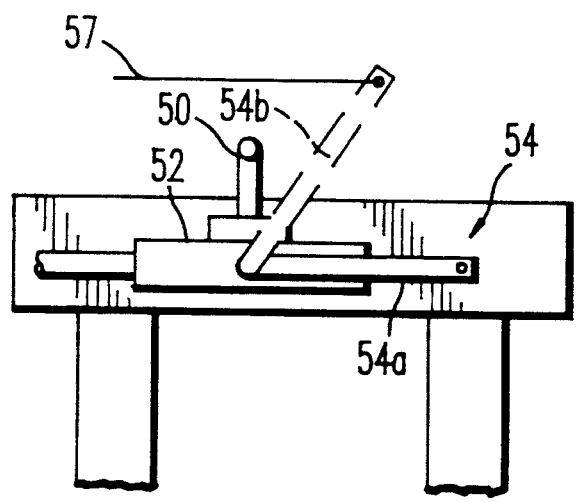
FIG. 3 is a side view of the upper plate shown in FIG. 2, depicting the fuel-in adjustment valve which can control the amount of fuel delivered to the vaporizer.

FIG. 3 is a side view of the top or first end (3) portion of the vaporizer unit of FIGS. 1 and 2. A bowden cable 57 operates a valve arm 54 for the valve 52. The valve arm is movable between an off position 54a and a full on position 54b to vary the amount of fuel passing along conduit 50 to the interior of the inner housing 2.

Briefly referring to FIGS. 4A–D, the baffles include a plurality of circular plates 74, preferably formed of red brass, with a sector of each plate missing as shown at 74a, to thereby define the passageway for the air and fuel vapor along the inner housing. For clarity, the fuel inlet conduit 50 is omitted from FIGS. 4A–D, however, it is to be understood that at least some of the baffles will include an aperture through which the conduit 50 extends. As shown in FIGS. 4A–D, the baffle plates 74 are angularly offset with respect to one another, such that the removed sectors of adjacent baffles are not axially aligned with one another. For example, a first plate may have an orientation as shown in FIG. 4A, with an adjacent plate oriented as shown in FIG. 4B, and subsequent plates arranged as shown in FIGS. 4C and 4D. As a result, a convoluted or tortuous passageway is defined within the inner housing, thereby promoting complete vaporization of the fuel and also promoting homogeneity of the fuel and air mixture. In addition, the baffles promote a regular and controlled or confined flow of the air and fuel, since without the baffles, the fuel would expand quite rapidly upon entering the inner housing or vapor tube 2, and would explode in all directions without developing a homogenous air-fuel mixture in which the fuel is fully vaporized. Still referring to FIGS. 4A–D, it will be noted that the removed sectors are offset in a clockwise direction with respect to one another when the successive baffles of FIGS. 4A–D are compared. In order to provide an even more tortuous passageway, the baffles are preferably arranged such that subsequent baffles are offset counterclockwise with respect to one another. As a result, during some portions of the passageway along the inner housing, the air and fuel vapor will travel along a somewhat helical path in a first direction, with the helix then reversing in another direction.

Figure 5:
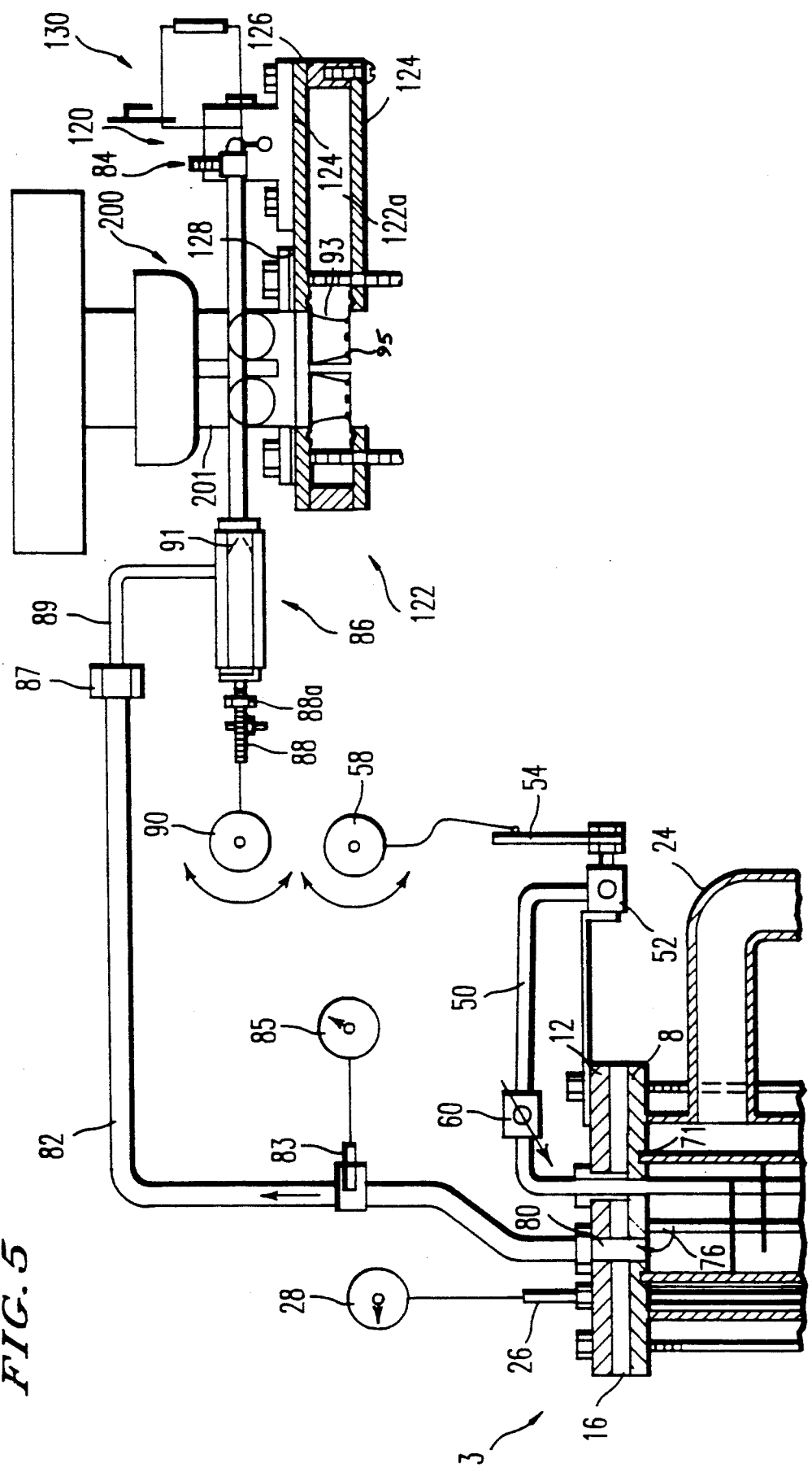
FIG. 5 shows the arrangement in which the vapor (exiting from the vaporizer) enters the engine with portions of the vapor introduction adapter assembly in section.

Thus, the baffles inside of the inner housing promote flow of the air and fuel mixture toward the vapor outlet 80, and also promote complete vaporization and homogeneity of the mixture. The vapor leaves the inner housing via vapor conduit 82, has its temperature taken via probe 83 and gauge 85, and is supplied to the engine as shown in FIG. 5. Preferably, an adjustment screw 84 is disposed along the vapor conduit 82 to thereby adjust the flow along the conduit, with the screw 84 as close as possible to the throttle 120. Preferably, the screw 84 includes a lock-nut to maintain the adjusted position of the screw. For an automobile, the vapor conduit is on the order of ½–1 inch, with the actual size depending upon the size of the engine. In order to ensure that the engine is not simultaneously fed fuel from the vapor conduit 82 and through the carburetor at the same time, a pintle valve 86 is also disposed between the vapor conduit 82 and an adapter plate assembly 122 which is disposed beneath the engine carburetor. Alternatively, a solenoid valve could be utilized instead of a pintle valve, however, high temperature solenoid valves can be quite costly. The pintle valve 86 includes a slide member 88 which is operated by, e.g., a push-pull Bowden airplane knob 90 located on the dash, such that when the slide member 88 is moved inwardly, flow through the valve is cut off, and when the slide member 88 is pulled out, the air-fuel vapor flow passes through the valve and to the engine. Preferably, a rod extending out of the slide member 88 is threaded and includes an adjustment member 88a, such that the amount of air-fuel vapor mixture passing through the pintle valve in the open condition can be varied. In addition, as schematically illustrated by the broken lines 91, an exit portion of the pintle valve is tapered, thereby providing a throttling action or increase in the flow velocity, or for an emergency cut-off.

The air-fuel vapor mixture enters the adapter plate assembly and is then sprayed through spray bars or rings 93 having a plurality of holes 95 therein, such that the air-fuel vapor mixture is sprayed into the engine. As shown in FIG. 5, a portion of the rings 93 protrudes slightly inwardly, such that a vaccuum pressure is created. A throttle 120 is also mounted upon the adapter plate assembly 122, with the throttle connected to the existing linkage of the carburetor, such that the throttle for the vapor mode is controlled by operation of the foot pedal as in the standard carburetor/fuel injection mode.

Still referring to FIG. 5, it will be seen that the adapter plate assembly is disposed beneath a conventional carburetor 200 of an engine, with air entering through the air throttle of a carburetor 201 in the same manner as during regular operation of the engine with the carburetor. Thus, the air throttle or butterfly valves 201 are opened and closed corresponding to movement of the foot pedal in the same manner as during operation of the engine without the vaporizer. The adapter plate assembly 122 is of a hollow construction, with a pair of plates 124 sandwiching end plates 126. The assembly is shown bolted together, however a welded construction may also be utilized.

The homogenous air and fuel vapor mixture from the vaporizer enters the throttle 120, and from the throttle 120, enters the adapter plate assembly 122 into the hollow chamber 122a therein. A plurality of holes 95 in the spray rings or spray bars 93 allow the air and fuel vapor mixture to pass from the interior of the adapter plate assembly such that the mixture is further mixed with air passing from the carburetor air throttle as the air from the carburetor passes through the spray rings. Thus, the air and fuel vapor mixture from the vaporizer is mixed with air from the carburetor and enters the engine for combustion.

The spray rings may have a variety of designs, however spray rings which are often utilized by propane companies have been found to be suitable, and typically will include adjustment features to vary the amount of communication (i.e., opening sizes through holes 95) from the interior of the adapter plate assembly through the spray rings 93. It should be noted that the size of the adapter plate assembly 122 is somewhat exaggerated in FIG. 5 for illustrative purposes. The size will vary in accordance with the particular engine application, however for an automobile engine, the thickness of the adapter plate assembly will be on the order of one-half inch total, with the plates 124 each on the order of one-sixteenth to one-eighth of an inch. A gasket 128 is provided between the adapter plate assembly and the carburetor, with the gasket formed of a suitable material to prevent damage to the carburetor as a result of high operating temperatures. As indicated generally at 130, the vapor mixture throttle 120 is controlled by suitable linkage to the existing throttle linkage of the carburetor, such that the vapor throttle 120 is also operated by the foot pedal of a vehicle (or other fuel control mechanism, dependent upon the vehicle or engine application).

Figure 6:
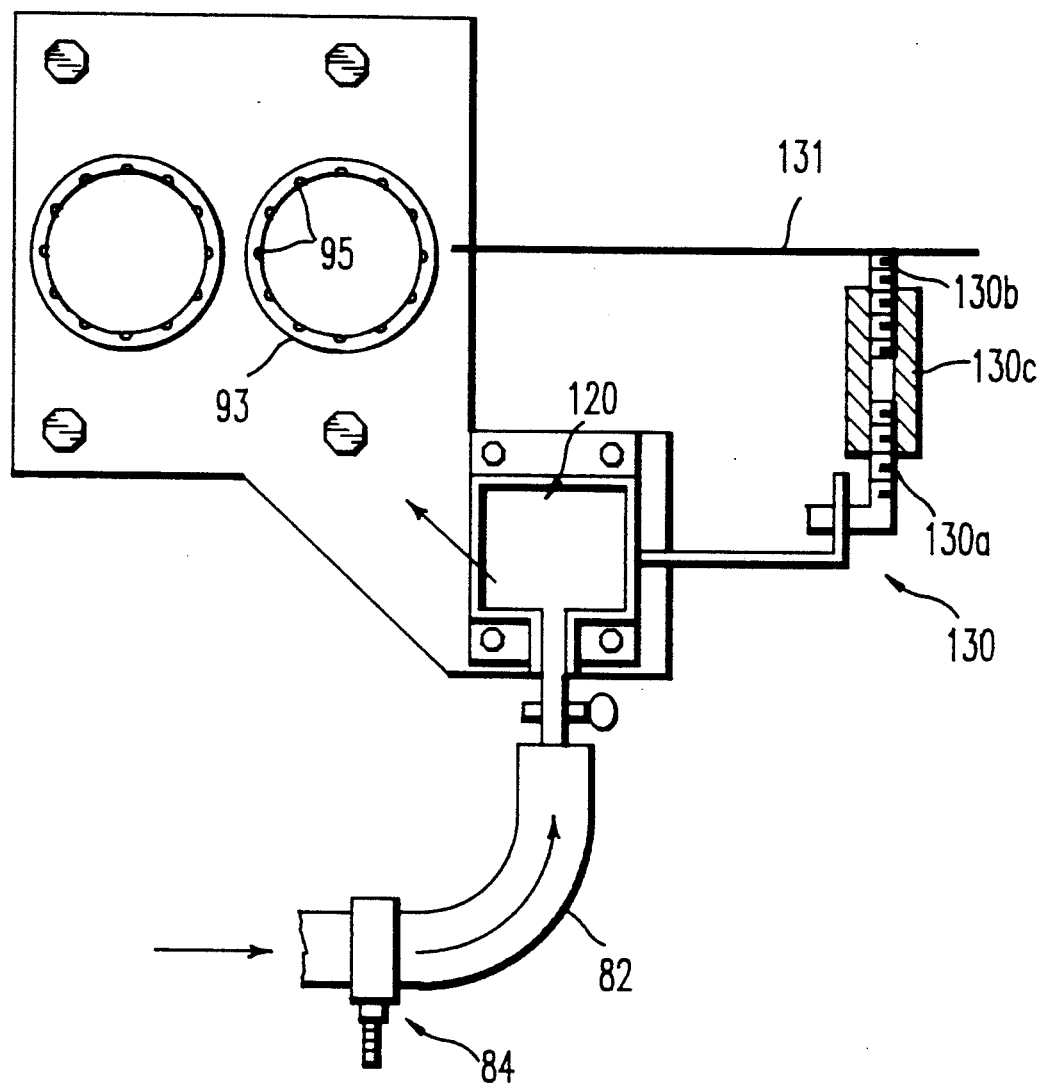
FIG. 6 is a plan view or top view of the adapter plate assembly of FIG. 5.

Referring now to FIG. 6, the throttle 120 is connected to the existing linkage of the carburetor 131 by the linkage 130, which includes threaded portions 130a, 130b, which are received by an internally threaded cover or collar 130c, thereby allowing for adjustment of the relationship between the throttle 120 (and linkage 130) and the existing carburetor linkage 131. Although not shown in FIG. 6, the carburetor is set above the area which includes the spray rings 93 with the bolts provided at positions corresponding to the positions of the carburetor bolt holes. As discussed earlier, a high temperature gasket material is provided between the carburetor and the adapter assembly to prevent damage to the carburetor. Operation of the foot pedal thereby controls the amount of air-fuel vapor mixture which passes from the conduit 82 through the throttle 120 and into the adapter plate assembly. The air-fuel vapor mixture then exits through spray holes 95 of the spray bars or spray rings 93, with air from the carburetor also passing through the interior of the spray rings for mixing with the air-fuel vapor mixture. The two spray rings 93 correspond to a two barrel carburetor. Four rings 93 would be provided for a four barrel carburetor.

Figure 7:
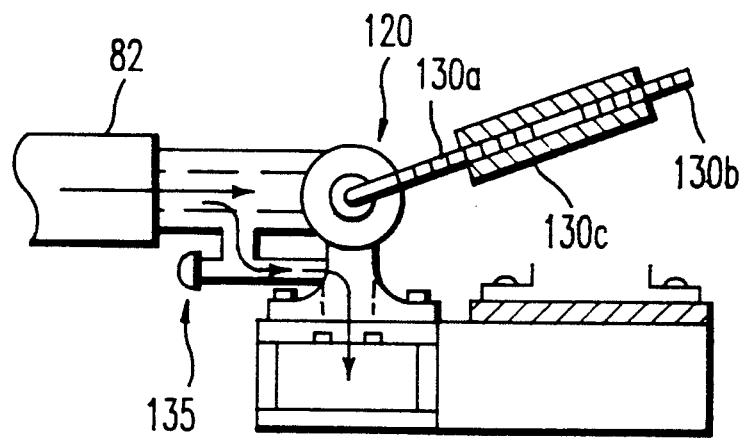
FIG. 7 is a side view of the adapter plate assembly together with the connection of the adapter plate throttle to the carburetor throttle linkage.

FIG. 7 shows an additional view of the throttle 120 which is connected to the linkage of the carburetor, and further with an adjustment screw 135 provided to adjust the amount of air-fuel vapor mixture during idling. Although a linkage connection is shown between the throttle 120 and the existing carburetor linkage, it is to be understood that a cam-type arrangement may also be desirable in providing a non-linear relationship between the operation of the throttle 120 and movement of the existing carburetor linkage 131.

Although the foregoing example illustrates the present invention for use with a carburetor, it is to be understood that the present invention is equally applicable to fuel injected engines. In a fuel injected engine, the adapter plate assembly is disposed beneath the air carburetor, with the vapor throttle connected to the air throttle of the fuel injection system. When the switch is utilized to change operation from fuel injection to vapor, the high pressure fuel pump (30 or more pounds pressure) is also cut-off, with a standard 5–7 pound electric fuel pump utilized in the fuel line to supply fuel to the vaporizer (e.g. in use with a fuel injector, a standard fuel pump can be provided between the two-way solenoid of FIG. 10 and the vaporizer). The changeover switch also turns off the fuel injectors.

Figure 8:
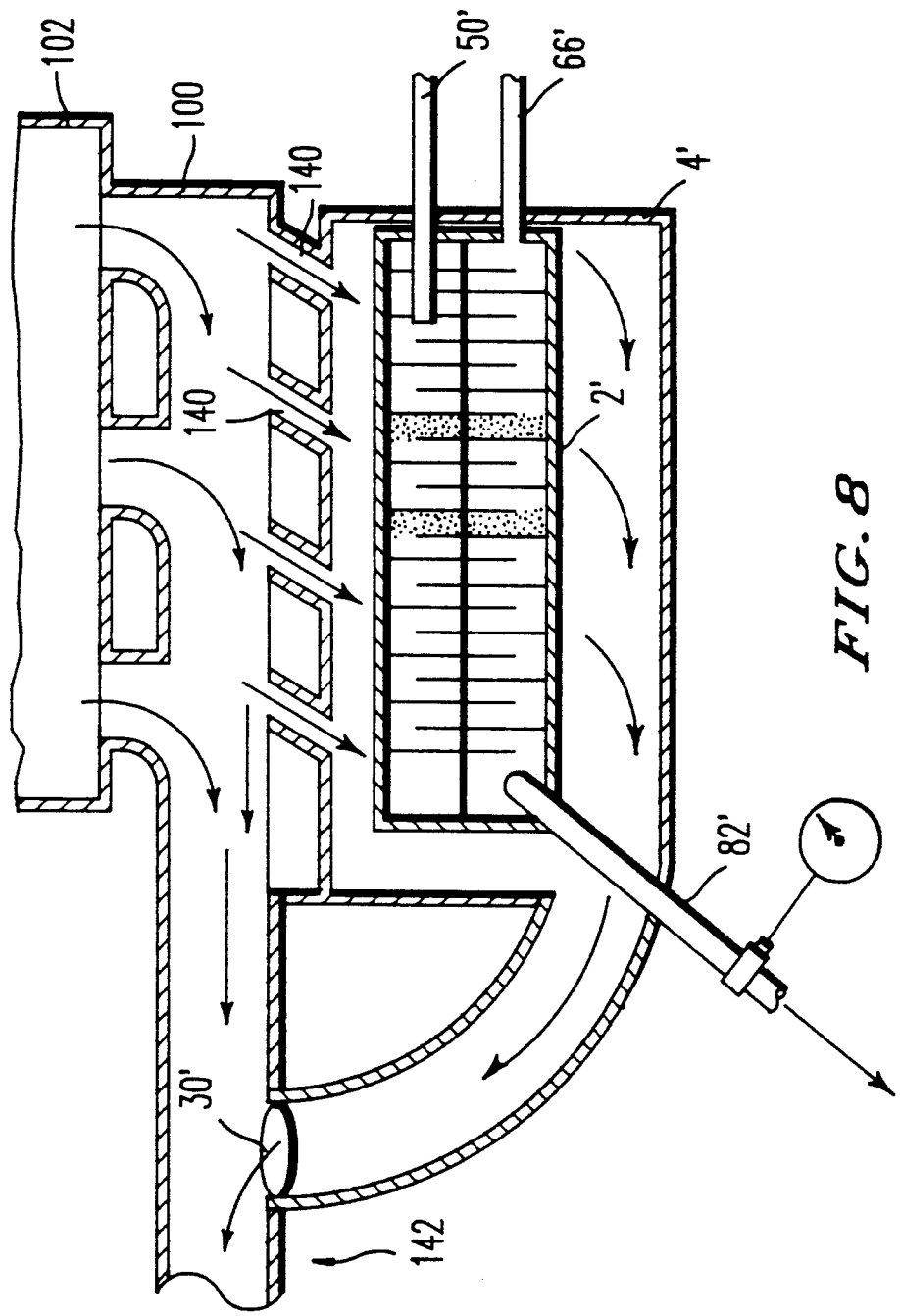
FIG. 8 illustrates an alternate arrangement in which the vaporizer of the present invention is disposed horizontally and housed adjacent the engine exhaust manifold.

Referring now to FIG. 8, an alternate arrangement of the vaporizer is shown. Such an arrangement is most probably more adaptable for use in an arrangement in which the vaporizer is part of the original engine equipment. However, it would also be possible to install such an arrangement on a retrofit basis. As shown in FIG. 8, a plurality of outlets 140 are provided which connect the outer housing 4' of the vaporizer to the exhaust manifold 100 of an engine 102. A butterfly valve 30' is disposed in the exhaust gas outlet of the outer housing 4' (for controlling exhaust temperatures in the outer housing), with the exhaust then returning to the exhaust system 142 of the vehicle.

As also shown in FIG. 8, the air and fuel inlet conduits 50', 66' can enter the same end of the inner housing, however the location at which the air and fuel exit their respective conduits and enter into the inner housing should be at least approximately at the same location, such that the air and fuel form a homogenous mixture as they pass along the tortuous passageway of the inner housing 2' and exit through the vapor-out conduit 82'. In addition, both the air and fuel inlet conduits can extend from a first end of the housing toward a second end (i.e., such that the air and fuel pass along the conduit extending through the interior of the inner housing before leaving their respective conduits). Referring back to the FIG. 1 arrangement, this may allow for easier maintenance, since the air and fuel connections can both be provided at the top or first end 3 of the inner housing.

Referring now to FIG. 9, the overall operation will be described. Some parts (e.g., exhaust in-out) have been omitted from FIG. 9 for improved clarity. When the engine is initially started, the exhaust temperatures are too low for effective operation of the vaporizer 1. Once a sufficient exhaust temperature is sensed by the probe 26, the fuel is shut off to the carburetor, and is directed to the vaporizer 1 (with the switching either manual or automatic, via the arrangement shown in FIG. 10). The temperature required for operation of the vaporizer 1 depends upon the fuel being utilized. Fuels in use today will become vaporized with vapor temperatures of 380°–420° F., possibly higher or lower depending upon refining procedures utilized by the various oil companies. The vacuum element 34 will control the butterfly valve 30 to maintain the appropriate exhaust temperature, which can be 500°–650° F., possibly as high as 700° F. The vapor temperature should not exceed 10° F. above the vaporization temperature of the fuel in order to avoid the light ends of gasoline from self-destruction at excessively high temperatures. A return spring 30a is provided for controlling the butterfly valve in conjunction with the vacuum element 34. As discussed earlier, the vacuum valve is connected to a vacuum storage 40 which is connected to the engine vacuum via line 160.

Although fuel supply to the carburetor is discontinued, a short amount of time is still required for the fuel to run through the carburetor. Accordingly, in order to avoid an excessively rich fuel supply to the engine, the air-fuel vapor mixture from the vaporizer is prevented from entering the engine until the engine runs out of fuel entering through the carburetor. Thus, the pintle valve 86 remains in a closed position until the engine runs out of fuel, and then is either manually or automatically (via temperature sensor) opened such that the mixture from the vaporizer enters the engine via throttle 120 and adapter plate assembly 122. The pintle valve is opened when the operator senses that the engine is running out of fuel, or may be operated automatically by a sensor which recognizes when the engine is running out of fuel. Such sensors could include, for example, rpm sensors, exhaust sensors, etc., or combinations of sensors and servo type electrical-mechanical systems. Operation of the engine then continues on the mixture from the vaporizer, with the operator controlling the fuel delivery by the foot pedal of the vehicle.

Although the FIG. 9 arrangement illustrates an automobile, it is to be understood that the fuel delivery system in accordance with the present invention is applicable to a wide range of engines and vehicles. For example, the fuel delivery system could be utilized in boats, jet skis, or other engines for which fuel economy and low emissions are desirable.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A system for providing fuel to an engine in a vaporized condition comprising:
    a vaporizer;
    a fuel conduit connected to said vaporizer for supplying fuel to said vaporizer;
    an air conduit connected to said vaporizer for supplying air to said vaporizer; and
    said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;
    said vaporizer further including a plurality of baffles defining said passageway, such that the air and fuel pass along a tortuous passageway within said vaporizer;
    wherein said vaporizer includes first and second ends, and wherein said fuel conduit extends into the vaporizer from the first end and toward the second end, and wherein said fuel conduit terminates at a nozzle portion, and further wherein air and fuel move along said passageway in a direction from said second end toward said first end.

2. The system of claim 1, wherein said vaporizer includes an outer housing and an inner housing at least substantially disposed within said outer housing, and whereby said air and fuel conduits supply air and fuel to the inner housing, and wherein said heat source includes means connected said outer housing to an exhaust system such that exhaust gas passes between the outer and inner housings.

3. The system of claim 2, wherein said inner housing is formed of brass.

4. The system of claim 1, wherein said vaporizer includes a rod extending therethrough, and wherein said baffles are mounted upon said rod.

5. The system of claim 4, wherein said vaporizer includes an inner housing of a substantially cylindrical shape, and wherein said baffles have a shape of a circle with a section removed such that the section removed allows the passageway to extend between said baffle and an inner surface of the inner housing, and wherein said baffles are angularly offset with respect to one another such that a removed section of one baffle is not axially aligned with a removed section of an adjacent baffle.

6. The system of claim 1, further including an adapter plate assembly for receiving air and vapor from said conduit and introducing said air and vapor into an engine.

7. The system of claim 1, further including a valve upstream of the vaporizer for selectively feeding fuel from a supply to the vaporizer in a first position, and for feeding fuel from the supply to one of a carburetor and a fuel injector in a second position.

8. The system of claim 1, further including at least one fibrous metal pad disposed between adjacent baffles for improving vaporization of fuel.

9. The system of claim 8, wherein the fibrous metal pads are formed of brass wool.

10. The system of claim 1, further including means for supplying water to said air conduit.

11. A system for providing fuel to an engine in a vaporized condition comprising:
    a vaporizer;
    a fuel conduit connected to said vaporizer for supplying fuel to said vaporizer;
    an air conduit connected to said vaporizer for supplying air to said vaporizer;
    said vaporizer including a source of heat, and a passageway extending therethrough, wherein air and fuel are introduced into a portion o said passageway and are heated and mixed as the air and fuel pass along said passageway toward a vapor outlet, said vapor outlet connected to a vapor conduit for supplying an air and fuel vapor mixture to an engine;
    wherein said vaporizer further includes a plurality of baffles defining said passageway, such that the air and fuel pass along a tortuous passageway within said vaporizer;
    said vaporizer further including an outer housing and an inner housing at least substantially disposed within said outer housing, and wherein said air and fuel conduits supply air and fuel to the inner housing, and wherein said heat source includes means connecting said outer housing to an exhaust system such that exhaust gas passes between the outer and inner housings;
    wherein the fuel conduit extends through a substantial portion of said inner housing to a nozzle portion at which fuel exits the fuel conduit, whereby the fuel is heated as it passes along said conduit within said inner housing and upon exiting through said nozzle portion, the fuel is mixed with air and travels along said passageway.

12. The system of claim 11, wherein said inner housing includes first and second ends, and wherein said fuel conduit enters said inner housing at the first end and extends toward said second end, and wherein the air and fuel mixture travels along said passageway in a direction from the second end toward the first end.

13. The system of claim 12, wherein said vapor outlet is located at the first end of the inner housing.

14. The system of claim 13, wherein said nozzle portion of said fuel conduit includes a plurality of holes extending through a wall of said conduit.

15. A system for providing fuel to an engine in a vaporized condition comprising:
    a vaporizer;
    a fuel conduit connected to said vaporizer for supplying fuel to said vaporizer;
    an air conduit connected to said vaporizer for supplying air to said vaporizer;
    said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;

said vaporizer further including a plurality of baffles defining said passageway, such that the air and fuel pass along a tortuous passageway within said vaporizer; and wherein a one-way check valve is disposed along said air conduit.

16. The system of claim 15, wherein said air conduit is open to ambient such that ambient air is drawn into said conduit and fed toward the vaporizer.

17. The system of claim 16, further including a compressed air source such that said air conduit can be selectively placed in communication with one of the compressed air source and the ambient.

18. A system for providing fuel to an engine in a vaporized condition comprising:
   a vaporizer;
   a fuel conduit connected to said vaporizer for supplying fuel to said vaporizer;
   an air conduit connected to said vaporizer for supplying air to said vaporizer;
   said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;
   wherein said vaporizer further includes a plurality of baffles defining said passageway, such that the air and fuel pass along a tortuous passageway within said vaporizer;
   the system further including an adapter plate assembly for receiving air and vapor from said conduit and introducing said air and vapor into an engine;
   wherein said adapter plate assembly includes a plurality of spray holes from which vapor is sprayed into an engine.

19. The system of claim 18, wherein said adapter plate assembly is disposed beneath a carburetor, and wherein air from the carburetor passes through a passage in said adapter plate assembly, and wherein said plurality of spray holes are disposed along said passage.

20. The system of claim 19, wherein a throttle is associated with said adapter plate assembly and wherein said throttle is coupled to linkage of the carburetor such that the throttle of the adapter plate assembly can be operated by a throttle control of a vehicle.

21. A system for providing fuel to an engine in a vaporized condition comprising:
   a vaporizer;
   a fuel conduit connected to said vaporizer for supplying fuel to said vaporizer;
   an air conduit connected to said vaporizer for supplying air to said vaporizer;
   said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;
   wherein said vaporizer further includes a plurality of baffles defining said passageway, such that the air and fuel pass along a tortuous passageway within said vaporizer;
   the system further including an adapter plate assembly for receiving air and vapor from said conduit and introducing said air and vapor into an engine; and
   wherein said system further includes a valve disposed between said adapter plate and said vaporizer for selectively opening and closing flow of vapor to said adapter plate.

22. The system of claim 21, wherein an actuator for said valve is disposed on a dashboard of a vehicle.

23. The system of claim 21, wherein said valve is a pintle valve.

24. A system for providing vaporized fuel to an engine comprising:
   a vaporizer including an inner housing in which fuel is vaporized, said housing including first and second ends;
   a heat source for supplying heat to said inner housing;
   said vaporizer further including a plurality of baffles disposed therein defining a tortuous passageway for fuel such that fuel is vaporized as it passes along said tortuous passageway; and
   a fuel inlet conduit extending inside of said inner housing from said first end of said inner housing to a location adjacent a second end of said inner housing, said fuel inlet conduit including a nozzle portion adjacent said second end of said housing, wherein fuel exits said fuel conduit at said nozzle portion; and
   a vapor outlet located at said first end of said inner housing;
   wherein fuel exits said nozzle and travels from said second end of said inner housing along said passageway and exits at said vapor outlet.

25. The system of claim 24, wherein at least some of said baffles include apertures through which said fuel inlet conduit extends.

26. The system of claim 25, further including an air inlet located at said second end of said inner housing.

27. The system of claim 26, wherein said source of heat includes means for supplying exhaust gases about said inner housing.

28. The system of claim 26, further including a vapor conduit which carries an air and fuel vapor mixture from said vapor outlet toward an engine, and wherein a vapor introducing means are provided for introducing the air and fuel vapor mixture into an engine.

29. The system of claim 28, wherein said vapor introducing means includes at least one spray member having a plurality of ports for spraying fuel into an engine.

30. The system of claim 29, wherein said vapor introducing means further includes a throttle for controlling an amount of air and fuel vapor supplied from said vapor conduit to said at least one spray member, and linkage means coupled to said throttle such that said throttle is controlled by a foot pedal of a vehicle.

31. The system of claim 29, wherein said at least one spray member is disposed beneath a carburetor of an engine.

32. The system of claim 31, wherein said spray member includes a spray ring having a plurality of spray ports through which the air and fuel vapor mixture exits, and wherein air from a carburetor passes through a center of said ring for mixing with the air and fuel vapor mixture exiting the spray ports.

33. The system of claim 26, further including an air conduit having one end connected to said air inlet and another end open to ambient air, and further including a one-way check valve disposed along said conduit.

34. The system of claim 27, further including an outer housing surrounding at least a portion of said inner housing and wherein exhaust gases enter an inlet of said outer housing and exit an outlet of said outer housing, said system further including temperature control means for maintaining a temperature of exhaust gases exiting said outlet.

35. The system of claim 24, further including an air conduit connected to said vaporizer and means for introducing water into said air conduit.

36. A system for supplying vaporized fuel to an engine comprising:
   a vaporizer having a fuel inlet, an air inlet and an air-fuel vapor outlet;
   a heat source for heating said vaporizer for vaporizing fuel; and
   an adapter plate assembly in communication with said air-fuel vapor outlet, said adapter plate assembly including at least one spray ring for spraying air and fuel vapor into an engine.

37. The system of claim 36, further including an air conduit connected to said air inlet, said air conduit having an open end exposed to ambient air, and wherein a pintle valve is disposed along a vapor conduit which connects said air-fuel vapor outlet to said adapter plate assembly, and wherein said vaporizer includes a plurality of baffles disposed therein.

38. The system of claim 37, further including brass wool pads disposed between at least some of said baffles.

39. The system of claim 36, further including means for introducing water into an air conduit which communicates with said air inlet such that an air and water mixture enters said vaporizer through the air inlet.

40. A system for supplying vaporized fuel to an engine comprising:
   a vaporizer having a fuel inlet, an air inlet and an air-fuel vapor outlet;
   a heat source for heating said vaporizer for vaporizing fuel;
   an assembly for receiving air-fuel vapor from said vaporizer and introducing said air-fuel vapor into an engine;
   wherein said vaporizer includes a tortuous passageway along which air and fuel pass such that a homogeneous air and fuel vapor mixture exits through said vapor outlet; and
   wherein said assembly includes a passage through which air passes for introduction into an engine, and wherein said passage includes a plurality of spray holes disposed therealong, and further wherein said air-fuel vapor mixture passes through said spray holes and mixes with air passing through said passage.

41. The system of claim 40, wherein at least one brass wool pad is disposed along said tortuous passageway.

42. The system of claim 40, wherein said assembly includes a throttle, and means for coupling said throttle to one of a carburetor and a fuel injection throttle control.

43. A system for providing fuel to an engine in a vaporized condition comprising:
   a vaporizer;
   a fuel conduit connected to said vaporizer for supplying fuel to said vaporizer;
   an air conduit connected to said vaporizer for supplying air to said vaporizer;
   said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;
   wherein said vaporizer further includes a plurality of baffles disposed along said vaporizer for defining said passageway, such that the air and fuel pass along a tortuous passageway within said vaporizer;
   wherein said plurality of baffles each have a shape of a circle with a section removed such that the section removed allows the passageway to extending between said baffle and an inner surface of said vaporizer, and wherein said plurality of baffles are angularly offset with respect to one another such that a removed section of one baffle is not axially aligned with a removed section of an adjacent baffle.

44. A system for providing fuel to an engine in a vaporized condition comprising:
   a vaporizer;
   a fuel conduit connected to said vaporizer for supplying fuel to said vaporizer;
   an air conduit connected to said vaporizer for supplying air to said vaporizer;
   said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;
   wherein said vaporizer further includes at least three baffles defining said passageway, such that the air and fuel pass along a tortuous passageway within said vaporizer;
   wherein said vaporizer includes a rod extending therethrough, and wherein said at least three baffles are arranged adjacent one another successively along said rod with said at least three baffles affixed to said rod, and wherein said passageway extends between each of said baffles and an inner surface of said vaporizer.

45. The system of claim 44, wherein said at least three baffles are substantially identical, and wherein adjacent baffles are angularly offset with respect to one another along said rod.

46. A system for providing fuel to an engine in a vaporized condition comprising:
   a vaporizer;
   a fuel conduit connected to said vaporizer for supplying fuel to said vaporizer;
   an air conduit connected to said vaporizer for supplying air to said vaporizer;
   said vaporizer including a source of heat, and a passageway extending therethrough, wherein air and fuel are introduced into a portion of said passageway and are heated and mixed as the air and fuel pass along said passageway toward a vapor outlet, said vapor outlet connected to a vapor conduit for supplying an air and fuel vapor mixture to an engine;

said vaporizer further including a plurality of baffles defining said passageway, such that the air and fuel pass along a tortuous passageway within said vaporizer;

wherein said fuel conduit includes an outlet nozzle at which fuel exits said fuel conduit and enters said vaporizer, said air conduit including an outlet at which air exits said air conduit and enters said vaporizer, said air conduit outlet located in a region of said fuel conduit outlet such that air and fuel are mixed and pass along said tortuous passageway toward a vapor outlet; and wherein said air conduit includes an inlet which is open to ambient air, and wherein air entering said inlet passes through said air conduit and enters said vaporizer without being compressed by a compressor.

47. The system of claim 46, wherein said plurality of baffles include a plurality of successive adjacent baffles mounted upon a rod extending through said vaporizer.

* * * * *